(12) United States Patent
Yang et al.

(10) Patent No.: US 10,609,621 B2
(45) Date of Patent: Mar. 31, 2020

(54) DIRECTED ACYCLIC GRAPH OPTIMIZATION FOR FUTURE TIME INSTANCE REQUESTED BY A CHILD NETWORK DEVICE

(71) Applicant: Cisco Technology, Inc., San Jose, CA (US)

(72) Inventors: Yi Yang, Cary, NC (US); Alvaro Enrique Retana, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 697 days.

(21) Appl. No.: 15/190,798

(22) Filed: Jun. 23, 2016

(65) Prior Publication Data
US 2017/0373964 A1    Dec. 28, 2017

(51) Int. Cl.
| | |
|---|---|
| *H04W 40/18* | (2009.01) |
| *H04W 40/24* | (2009.01) |
| *H04L 12/721* | (2013.01) |
| *H04W 40/30* | (2009.01) |
| *H04L 12/753* | (2013.01) |
| *H04L 12/717* | (2013.01) |

(52) U.S. Cl.
CPC ............ *H04W 40/18* (2013.01); *H04L 45/12* (2013.01); *H04L 45/42* (2013.01); *H04L 45/48* (2013.01); *H04W 40/24* (2013.01); *H04W 40/30* (2013.01)

(58) Field of Classification Search
CPC .................................................... H04W 40/18
USPC ........................................................ 370/254
See application file for complete search history.

(56) References Cited

U.S. PATENT DOCUMENTS

| | | |
|---|---|---|
| 7,428,221 B2 | 9/2008 | Thubert et al. |
| 8,060,617 B2 | 11/2011 | Moon |
| 2011/0228788 A1* | 9/2011 | Thubert .................. H04L 41/12 370/400 |
| 2013/0064072 A1* | 3/2013 | Vasseur ................... H04L 43/10 370/225 |
| 2015/0036545 A1* | 2/2015 | Lee ......................... H04L 45/48 370/256 |
| 2015/0236909 A1 | 8/2015 | Valluri et al. |
| 2016/0072697 A1 | 3/2016 | Thubert et al. |

(Continued)

OTHER PUBLICATIONS

Dejean et al., "Selective DIS for RPL", ROLL Working Group, Internet-Draft, [online], Mar. 7, 2011, [retrieved on Jun. 7, 2016]. Retrieved from the Internet: URL: <https://tools.ietf.org/pdf/draft-dejean-roll-selective-dis-00.pdf>, pp. 1-11.

(Continued)

*Primary Examiner* — Kodzovi Acolatse
*Assistant Examiner* — Abdeltif Ajid
(74) *Attorney, Agent, or Firm* — Leon R. Turkevich (57) ABSTRACT

In one embodiment, a method comprises receiving, by a network device within a tree-based topology rooted by a root network device, a request message from a child network device for generating an optimized tree-based topology for a future use by the child network device at a future time instance; the network device executing an objective function for generating the optimized tree-based topology for the future use by the child network device; and the network device providing network communications, for the child network device, at the future time instance using the optimized tree-based topology.

17 Claims, 5 Drawing Sheets

(56) References Cited

U.S. PATENT DOCUMENTS

| | | | | |
|---|---|---|---|---|
| 2016/0182306 A1* | 6/2016 | Liu | ...................... | H04W 84/18 |
| | | | | 370/255 |
| 2016/0197829 A1 | 7/2016 | Thubert et al. | | |
| 2016/0262081 A1* | 9/2016 | Guo | ...................... | H04W 24/08 |
| 2016/0308786 A1* | 10/2016 | Chen | ...................... | H04L 47/825 |
| 2018/0262401 A1* | 9/2018 | Shah | ...................... | H04W 40/32 |

OTHER PUBLICATIONS

Goyal et al., "DIS Modifications", Internet Engineering Task Force, Internet-Draft, [online], Oct. 12, 2012, [retrieved on Jun. 7, 2016]. Retrieved from the Internet: URL: < https://tools.ietf.org/html/draft-goyal-roll-dis-modifications-01>, pp. 1-10.

Thubert, Ed. et al., "An Architecture for IPv6 over the TSCH mode of IEEE 802.15.4e", 6TiSCH, Internet-Draft, [online], Oct. 27, 2014, [retrieved on Dec. 11, 2015]. Retrieved from the Internet: URL: <https://tools.ietf.org/pdf/draft-ietf-6tisch-architecture-04.pdf>, pp. 1-32.

Zhong, Ed. et al., "DIS Modifications", Internet Engineering Task Force, Internet-Draft, [online], Nov. 4, 2015, [retrieved on Jun. 7, 2016]. Retrieved from the Internet: URL: <https://tools.ietf.org/html/draft-zhong-roll-dis-modifications>, pp. 1-14.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Vasseur, Ed., et al., "Routing Metrics Used for Path Calculation in Low-Power and Lossy Networks", Internet Engineering Task Force (IETF), Request for Comments: 6551, Mar. 2012, pp. 1-30.

Thubert, Ed., "Objective Function Zero for the Routing Protocol for Low-Power and Lossy Networks (RPL)", Internet Engineering Task Force (IETF), Request for Comments: 6552, Mar. 2012, pp. 1-14.

Vasseur, "Terms Used in Routing for Low-Power and Lossy Networks", Internet Engineering Task Force (IETF), Request for Comments: 7102, Jan. 2014, pp. 1-8.

Lohmann, "Wireless Introduction", Hart Communication Foundation, HCF_LIT-131, [online], Mar. 1, 2010, [retrieved on Jan. 29, 2013]. Retrieved from the Internet: URL:<http://www.hcf-files.com/webasyst/published/DD/html/scripts/getfolderfile_zoho.php?DL_ID=MTA5NQ%3D%3D&ID=72a7beb0a6eeba6aaf06ef19e00ce258&DB_KEY=V0VCRkIMRVM%3D>, pp. 1-11.

Thubert et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, XP032485811, pp. 541-546.

Thubert et al., U.S. Appl. No. 15/171,518, filed Jun. 2, 2016.

* cited by examiner

DIRECTED ACYCLIC GRAPH OPTIMIZATION FOR FUTURE TIME INSTANCE REQUESTED BY A CHILD NETWORK DEVICE

TECHNICAL FIELD

The present disclosure generally relates to directed acyclic graph optimization for a future time instance requested by a child network device.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes in the form of a directed acyclic graph (DAG) toward a single "root" network device, also referred to as a "DAG root" or a "DAG destination". Hence, the DAG also is referred to as a Destination Oriented DAG (DODAG). Network traffic moves either "up" towards the DODAG root or "down" towards the DODAG leaf nodes.

The DODAG can be formed based on a DODAG information object (DIO) advertised by the DAG root, where a "child" network device detecting the DIO can select the DAG root as a parent in the identified DODAG based on comparing network topology metrics (advertised in the DIO) to a prescribed objective function specified in the DIO for the RPL instance. The "child" network device, upon attaching to its parent, can output its own DIO with updated network topology metrics that enable other network devices to discover the DODAG, learn the updated network topology metrics, and select a DODAG parent based on the objective function specified in the DIO for attachment to the DODAG.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises receiving, by a network device within a tree-based topology rooted by a root network device, a request message from a child network device for generating an optimized tree-based topology for a future use by the child network device at a future time instance; the network device executing an objective function for generating the optimized tree-based topology for the future use by the child network device; and the network device providing network communications, for the child network device, at the future time instance using the optimized tree-based topology.

In another embodiment, an apparatus comprises a device interface circuit and a processor circuit. The device interface circuit is configured for receiving a request message from a child network device, the apparatus implemented as a network device within a tree-based topology rooted by a root network device. The request message requests generation of an optimized tree-based topology for a future use by the child network device at a future time instance. The processor circuit is configured for executing an objective function for generating the optimized tree-based topology for the future use by the child network device. The processor circuit further is configured for providing network communications, for the child network device, at the future time instance using the optimized tree-based topology.

In another embodiment, one or more non-transitory tangible media are encoded with logic for execution by a machine and when executed by the machine operable for: receiving, by the machine implemented as a network device within a tree-based topology rooted by a root network device, a request message from a child network device for generating an optimized tree-based topology for a future use by the child network device at a future time instance; executing an objective function for generating the optimized tree-based topology for the future use by the child network device; and providing network communications, for the child network device, at the future time instance using the optimized tree-based topology.

DETAILED DESCRIPTION

Particular embodiments enable a child network device, having attached to a network device in a tree-based topology rooted by a root network device in a data network, to request generation of an optimized tree-based topology for a future use by the child network device at a future time instance. The tree-based topology can be at least a portion of a directed acyclic graph (DAG) of a data network. The network device, in response to receiving the request, can execute an identified objective function (e.g., specified in the request) for generation of the optimized tree-based topology for the future use by the child network device at the future time instance.

Figure 1A:
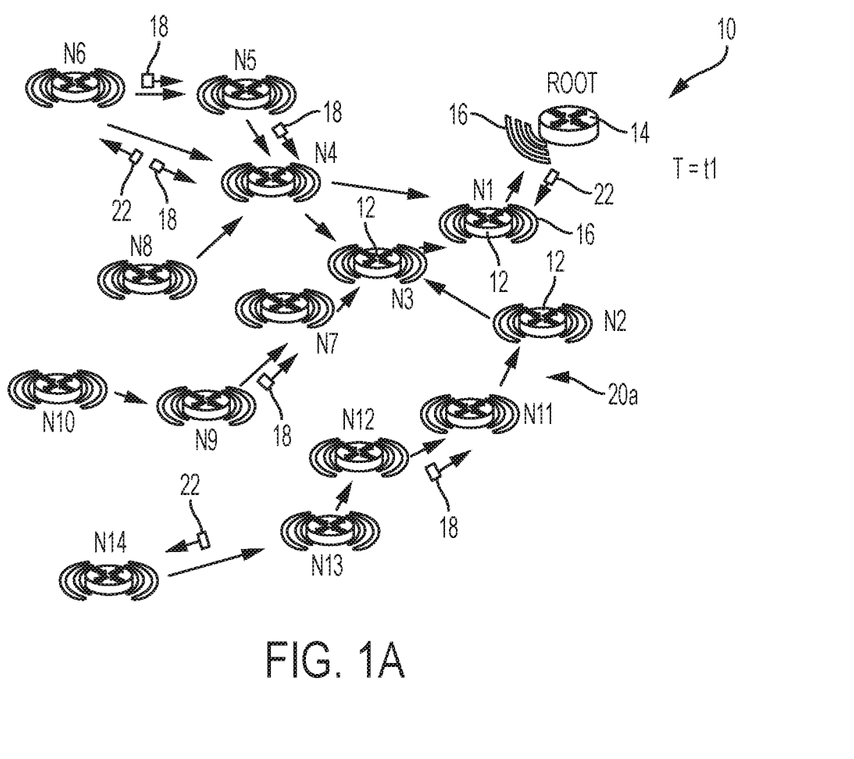
FIGS. 1A-1C illustrate an example system having an apparatus configured for generation of a tree-based topology that is optimized for a future time instance requested by a child network device, according to an example embodiment.
Figure 1B:
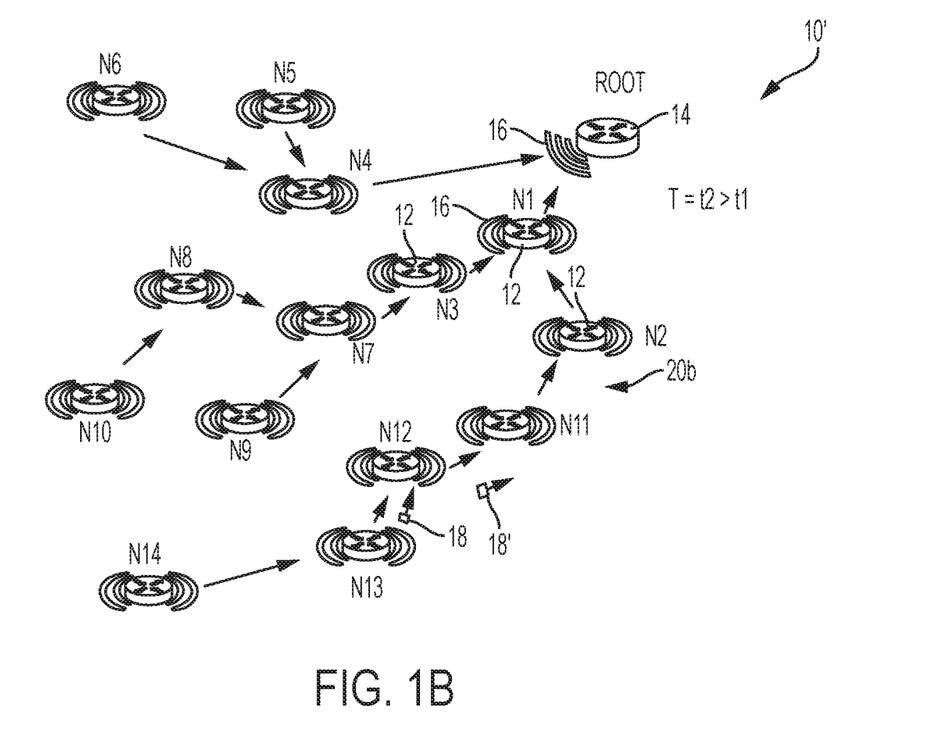
Figure 1C:
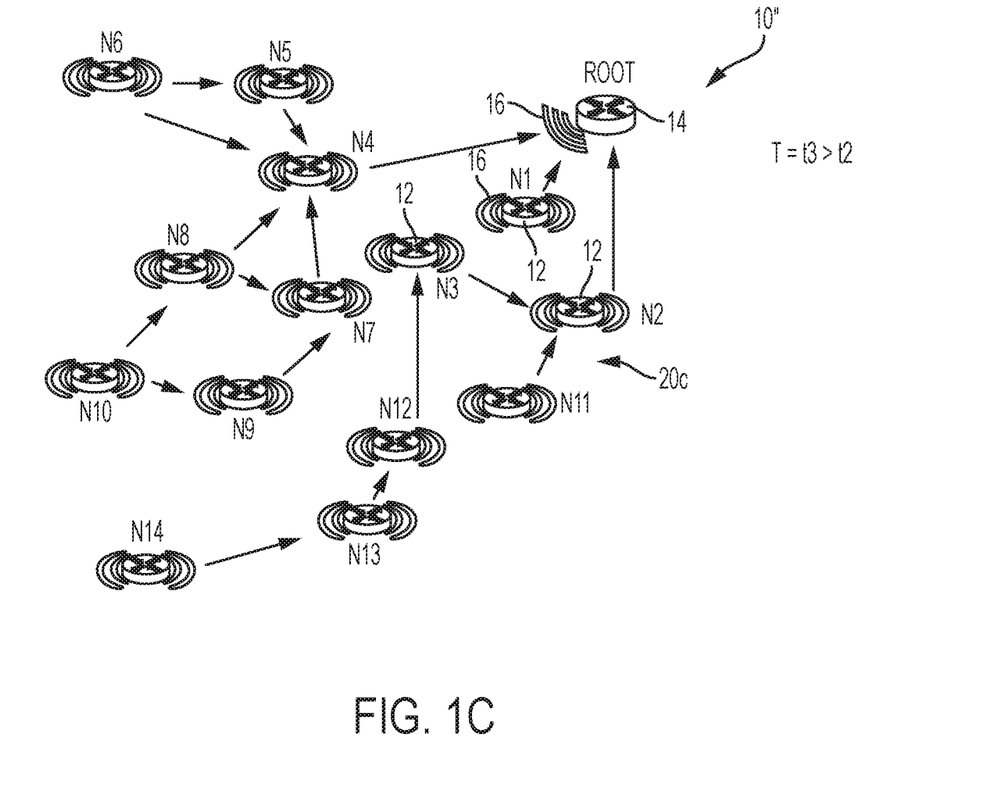

FIGS. 1A-1C illustrate example data networks 10, 10', and 10" having an apparatus 12 configured for generation of a tree-based topology that is optimized for a future time instance requested by a child network device, according to an example embodiment. The data networks 10, 10', and 10" represent the same data network at respective time instances t1, t2, and t3, where the time instance T=t2 of FIG. 1B is after the time instance T=t1 of FIG. 1A, and the time instance T=t3 of FIG. 1C is after the time instance T=t2 of FIG. 1B. Each of the data networks 10, 10' and 10" each comprise network devices (e.g., "N1 through "N14") 12 attached to at least one of another network device 12 or a root network device "ROOT" 14 via wireless data links 16 that form a link layer mesh topology. Each child network device (e.g., "N12" in FIG. 1A) 12 can output a request message 18 to its "parent" network device (e.g., "N11") in an existing tree-based topology (e.g., 20a of FIG. 1), where the request message 18 requests that the network device (e.g., "N11") generates an optimized tree-based topology (e.g., 20b of FIG. 1B) for a future use by the child network device (e.g., "N12").

Although only the network devices "N1", "N2", and "N3" are labeled with the reference numeral "12" in FIGS. 1A-1C to avoid cluttering in the Figures, it should be apparent that all the network devices "N1" through "N14" are allocated the reference numeral "12" for purposes of the description herein. Further, it should be apparent that all the network devices "N1" through "N14" 12 are configured for establishing wireless data links 16 (illustrated as curved lines radiating from each device 12 or 14), even though only the wireless data links for the network device "N1" 12 and root network device 14 are labeled with the reference numeral "16" to avoid cluttering in the Figures.

Conventional approaches to generating a DODAG topology assume that the DODAG root network device 14 outputs a routing advertisement message (e.g., a RPL DIO message according to RFC 6550, etc.) 22 that specifies the Objective Function (OF) to be used by network devices 12 in evaluating whether to attach to the root network device 14 or other neighboring network devices 12. The objective function specified in the routing advertisement message (e.g., an Objective Code Point (OCP) value according to RF 6550) defines how RPL nodes 12 select and optimize routes within the DODAG topology according to the objective function specified by the root network device. Hence, the RPL nodes 12 in conventional approaches can form the initial tree-based DODAG topology (e.g., 20a of FIG. 1) based on the objective function specified by the root network device 14 at the time of network formation, for example an objective function "OF1" for "maximum network stability" (i.e., minimal movement of network devices such that relatively immobile network devices 12 have a higher rank than those having higher mobility). In other words, once the network devices 12 establish the tree-based topology 20a in response to the objective function specified by the root network device 14 in the routing advertisement message 22, conventional approaches would maintain the tree-based topology 20a of FIG. 1 using the objective function specified by the root network device 14 in the routing advertisement message 22, regardless of the subsequent needs of the network devices 12. Any prior attempts to reserve network resources for a future event (e.g., according to Resource Reservation Protocol) would be based on an assumed availability of existing network resources within the existing network topology.

According to example embodiments, a child network device in a tree-based topology (e.g., 20a of FIG. 1A) can generate and send to its parent network device a request message 18 to generate an optimized tree-based topology (e.g., 20b of FIG. 1B or 20c of FIG. 1C) for a future use by the child network device, at a future time instance, using an objective function that can be separate and distinct from the original objective function specified by the root network device 14 during formation of the initial tree-based topology 20a of FIG. 1A.

Although only a subset of the devices 12 and 14 in the Figures are illustrated as outputting a routing advertisement message 22 to avoid cluttering in the Figures, it should be apparent that all the network devices "N1" through "N14" 12 and the root network device 14 can output a corresponding routing advertisement message 22. Further, it should be apparent that all the network devices "N1" through "N14" 12 can have one or more attachments (illustrated in FIGS. 1A-1C as arrows), where each attachment is used to illustrate an optimized next-hop path chosen for an identifiable objective function, described below.

Figure 2:
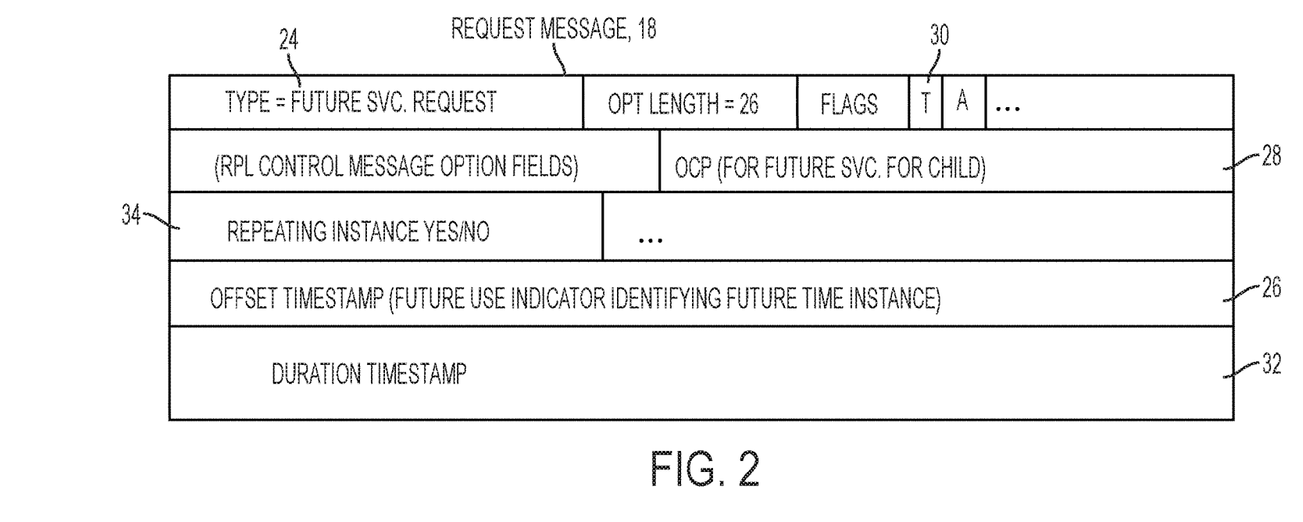
FIG. 2 illustrates an example request message including attributes describing a future time instance for optimizing a tree-based topology for the future time instance according to an identified objective function, according to an example embodiment.

FIG. 2 illustrates an example request message 18 including attributes describing a future time instance (e.g., t2 or t3) for optimizing a tree-based topology (e.g., 20b, 20c) for the future time instance according to an identified objective function, according to an example embodiment. The request message 18, implemented for example in accordance with DODAG configuration options based on Section 6.7 of RFC 6550, can include a future service request indicator 24 as a prescribed option type (i.e., the "type" being a future service request), a future use indicator 26 identifying the future time instance (e.g., as an offset value subsequent to an epochal start time of the data network 10, or as a future absolute time value), a child-selected objective function indicator 28 that identifies the child-selected objective function ("OFi" in FIG. 4) to be used for generating the optimized tree-based topology for use at the time specified in the future use indicator 26, a time-based flag "T" 30 identifying that the identified objective function (OF) specified in the child-selected objective function indicator 28 is to be used for a future time specified in the future use indicator 26. The request message 18 also can identify a future duration 32 relative to the future use indicator 26 identifying the future time instance, and/or a repeating instance attribute 34 identifying repeating instances (e.g., every hour, every twelve hours, every day, etc.) following the future time instance 26. The request message 18 can specify other topology-related routing metrics as described in RFC 6551.

Hence, a child network device (e.g., "N6") at epochal time "T=t1" in FIG. 1A can send a request message 18 to its "parent" network device "N4" specifying the future service request indicator 24 and the child-selected objective function indicator 28 (e.g., "OF2"), for generation of an optimized tree-based topology (20b in FIG. 1B) for use by the child network device "N6" at the future time instance (e.g., T=t2) specified in the future use indicator 26 according to the objective function (e.g., "OF2"). The network device (e.g., "N4") 12, having received a request message 18 from a child network device (e.g., "N6") can execute the objective function (e.g., "OF2") specified in the child-selected objective function indicator 28, for generating the tree-based topology 20b that is optimized for the future use by the child network device "N6").

As described in further detail below, a network device 12 can generate the optimized tree-based topology 20 based either on its own actions (e.g., determining whether to utilize a same parent device or a different device), or based on sending an updated request message 18' to its own parent network device (i.e., "grandparent device") to determine whether the grandparent device can provide the optimized tree-based topology for the child network device at the future time instance. Hence, a request message 18 can be propagated toward the root network device 14 to ensure each network device along the path from the requesting child network device to the penultimate network device 12 (before the root network device 14) can provide the optimized tree-based topology at the future time instance as requested by the child network device.

Figure 3:
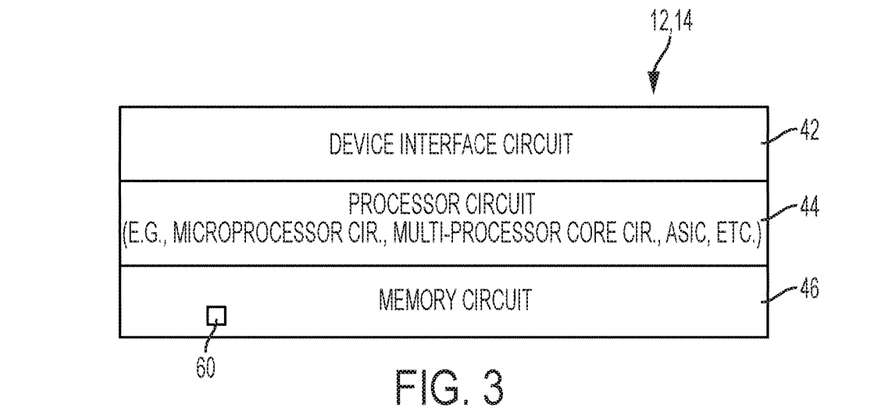
FIG. 3 illustrates an example implementation of any one of the network devices of FIG. 1, according to an example embodiment.

FIG. 3 illustrates an example implementation of any one of the devices 12 and/or 14 of FIGS. 1A-1C, according to an example embodiment. Each apparatus 12 and 14 is a physical machine (i.e., a hardware device) configured for implementing network communications with other physical machines 12 or 14 in the data network 10 or via wired or wireless data links, illustrated in FIGS. 1A-1C as wireless data links 16 that form a wireless mesh network. The data network 10 can provide communications to a local area network (LAN) and/or a wide area network (WAN) (e.g., the Internet), for example based on a gateway device (not shown) in communication with the root network device 14. The term "configured for" or "configured to" as used herein with respect to a specified operation refers to a device and/or machine that is physically constructed and arranged to perform the specified operation. Hence, each apparatus 12 or 14 is a network-enabled machine implementing network communications via the data network 10.

Each apparatus 12 and/or 14 can include a device interface circuit 42, a processor circuit 44, and a memory circuit 46. The device interface circuit 42 can include one or more distinct physical layer transceivers for communication with any one of the other devices 12 and/or 14; the device interface circuit 42 also can include an IEEE based Ethernet transceiver for communications with the devices of FIGS. 1A-1C via any type of data link (e.g., a wired or wireless link, an optical link, etc.) 16. The processor circuit 44 can be configured for executing any of the operations described herein, and the memory circuit 46 can be configured for storing any data or data packets as described herein.

Any of the disclosed circuits of the devices 12 and/or 14 (including the device interface circuit 42, the processor circuit 44, the memory circuit 46, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 46) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 46 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 46 can be implemented dynamically by the processor circuit 44, for example based on memory address assignment and partitioning executed by the processor circuit 44.

Figure 4:
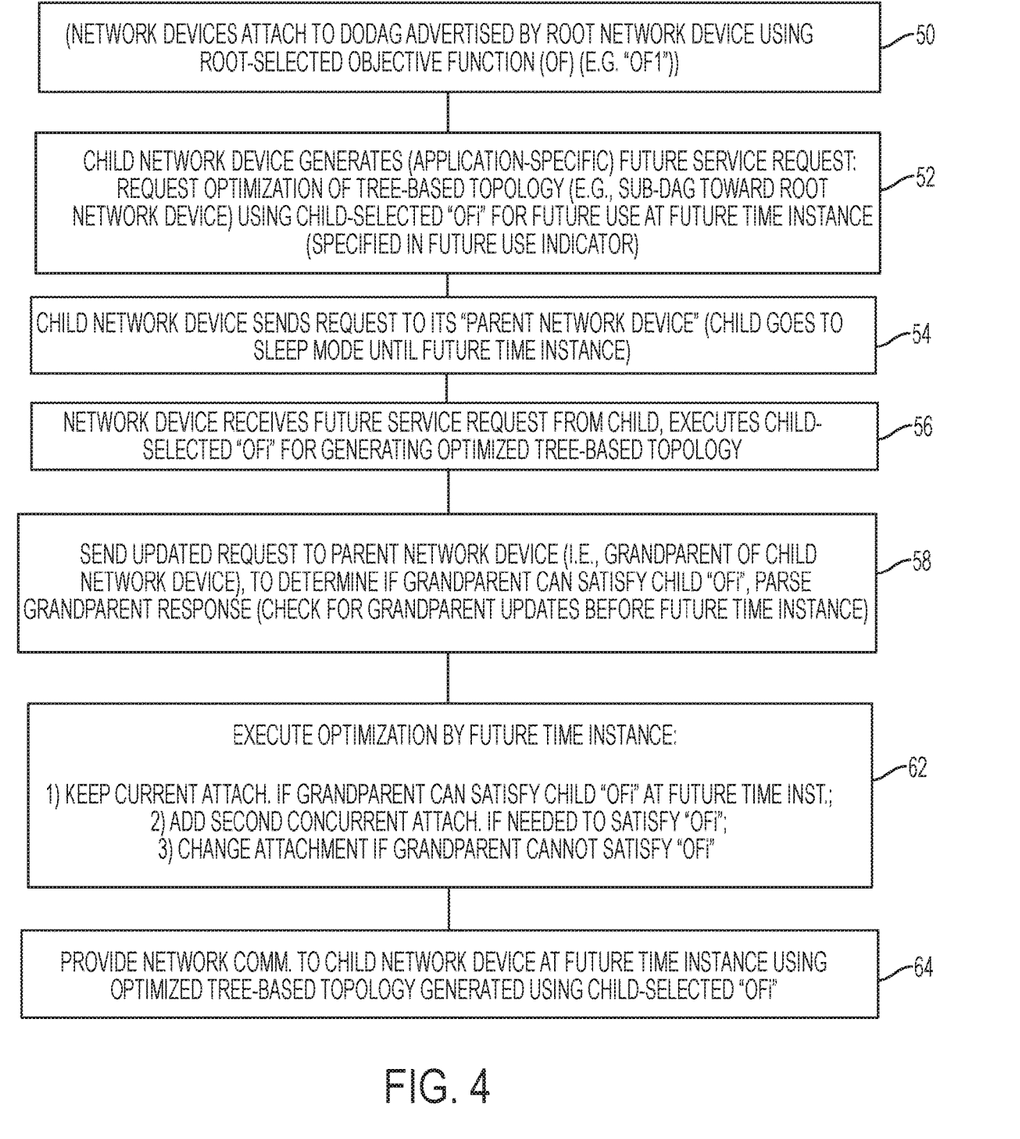
FIG. 4 illustrates an example method by the apparatus of FIG. 1 configured for generation of a tree-based topology that is optimized for a future time instance requested by a child network device, according to an example embodiment.

FIG. 4 illustrates an example method by an apparatus 12 of FIGS. 1A-1C for generation of a tree-based topology (e.g., 20b, 20c) that is optimized for a future time instance requested by a child network device, according to an example embodiment. The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 4, the device interface circuit 42 of each network device 12 is configured for detecting and receiving, in operation 50, one or more routing advertisement messages 22 (e.g., a DIO) from the root network device 14 and/or one or more of the network devices 12 having already attached to the tree-based topology 20 according to RFC 6550. For example, FIG. 1A illustrates the network device "N1" 12 receiving a routing advertisement message 22 from the root network device 14 for formation of the tree-based topology 20a according to the objective function "OH" specified in the routing advertisement message 22. FIG. 1A also illustrates other network devices 12 receiving updated routing advertisement messages 22 from attached network devices 12, for example network devices "N6" and "N14" 12 receiving updated routing advertisement messages 22 from the respective attached network devices "N4" and "N13" 12. Hence, each network device 12 in FIG. 1A at the time instance "T=t1" can initially attach to the DAG 20*a* rooted by the root network device 14 according to the objective function "OFF". It is assumed herein each child network device maintains its attachment to at least one "parent" network device throughout the time described herein (i.e., from time t1 through time t3) to enable the "parent" network device to execute the optimization operations described herein; as apparent from the foregoing, if a parent network device becomes unavailable, the child network device can find a new parent using existing RPL techniques.

In response to attaching to a network device 12 in the tree-based topology 20*a*, the processor circuit 44 of a child network device 12 is configured for generating in operation 52 a request message 18 requesting generation of an optimized tree-based topology (e.g., 20*b* or 20*c*), according to a child-selected objective function (e.g., "OFi"), for a future use at a future time instance specified by the future use indicator 26 in the request message 18 (e.g., due to a future network-based application executed by the child network device). The optimized tree-based topology can be a path consisting of a single hop-by hop track to the root network device 14, a path comprising multiple tracks (e.g., via multiple parent network devices), etc. As illustrated in FIGS. 2 and 4, the child-selected objective function ("OFi") can be independent and distinct from the objective function (e.g., "OF1") chosen by the root network device 14 as specified in the routing advertisement message 22: example objective functions can include minimal hops (e.g., "OF2") at the future time instance, minimal delay to the root (e.g., "OF3") at the future time instance, minimum jitter (e.g., "OF4") at the future time instance, etc.

Hence, a child network device in operation 54 can output its own request message 18 specifying parameters needed by the child network device for optimized network communications at a future time instance. Hence, the request message 18 enables the network devices 12 to proactively optimize the network topology in preparation for the child network device.

As illustrated in FIG. 1A (coinciding with the time "T=t1"), the child network device "N6" 12 can send in operation 54 a request message 18 to its parent network device "N4" for execution of the objective function "OF2" (minimum hops) to be provided at the future time instance "T=t2" (at the time coinciding with FIG. 1B); the child network device "N12" can send in operation 54 a request message 18 to its parent network device "N11" for execution of the objective function "OF3" (minimum delay) to be provided at the future time instance "T=t2"; the child network device "N5" 12 can send in operation 54 a request message 18 to its parent network device "N4" for execution of the objective function "OF3" to be provided at the future time instance "T=t3" (at the time coinciding with FIG. 1C); and the child network device "N9" 12 can send in operation 54 a request message 18 to its parent network device "N7" for execution of the objective function "OF4" (minimum jitter) to be provided at the future time instance "T=t3". FIG. 1B illustrates the network device "N13" in operation 54 (at time instance "T=t2") outputting a request message 18 to its parent network device "N12" for execution of the objective function "OF4" for network communications to be provided at the future time instance "T=t3".

The device interface circuit 42 of a network device (e.g., "N4", "N7", and "N11" in FIG. 1A; "N12" in FIG. 1B) 12 is configured for receiving in operation 56 the request message 18 from its child network device, as described previously. The processor circuit 44 of each network device 12 is configured for responding to each received request message 18 by detecting the child-selected objective function indicator 28 identifying the child-selected objective function to be used relative to the future use indicator 26, and executing the child-selected objective function to determine the optimized tree-based topology to be used at the future time instance specified by the future use indicator 26. For example, the processor circuit 44 of each network device 12 receiving a request message 18 can store optimization attributes, including the pending child requests 18, optimization results, etc., in a data structure (60 of FIG. 3) that can identify each pending child request 18 as a corresponding distinct child-initiated RPL instance. The processor circuit 44 also can execute the child-selected objective function based on the future duration 32 and/or the repeating instance attribute 34 (depending on implementation, the processor circuit 44 also can apply default values for any one of the future duration 32 or the repeating instance attribute 34 if no associated values are specified).

The processor circuit 44 of the network device 12 (e.g., "N12" of FIG. 1B) having received the request message 18 in operation 56 from its child network device (e.g., "N13" of FIG. 1B) can generate and send in operation 58 an updated request (18' in FIG. 1B) to its parent network device (e.g., "N11" of FIG. 1B), also referred to as the "grandparent" of the child network device. The updated request 18' enables the network device (e.g., "N12" of FIG. 1B) to determine whether the grandparent network device (e.g., "N11") is able to provide the optimization needed for the future use by the child network device according to the child-selected objective function (e.g., jitter, latency, etc.); similarly, the grandparent network device (e.g., "N11") can propagate the updated request 18' toward the root network device 14 to determine whether the existing path in the existing topology can provide the optimized-tree-based topology at the future time instance requested by the child network device. The processor circuit 44 of the network device (e.g., "N12" of FIG. 1B) can parse any response to determine whether the grandparent network device can satisfy the child-selected objective function at the future time instance; the processor circuit 44 also can check for updates from the grandparent device prior to the future time instance, for example due to network topology changes, network device status changes, traffic changes in the data network 10, etc.

The processor circuit 44 of the network device 12 having received a request message 18 can execute in operation 62 the optimization by the future time instance specified by the future use indicator 26, e.g., within about one second of the network time reaching the future use indicator 26, to provide in operation 64 the network communications for the child network device at the future time instance using the optimized tree-based topology based on the child-selected objective function. For example, the processor circuit 44 of the network device 12 in operation 62 can maintain the existing attachment if the grandparent network device can satisfy (e.g., guarantee) the child-selected objective function: as illustrated in FIG. 1B, the network device "N11" maintains the attachment to the grandparent network device "N2" 12 for providing network communications to the child network device "N12" 12 according to the child-selected objective function "OF3".

Note, however, in operation 62 that the grandparent network device "N2" (grandparent to network device "N12", can detect prior to the time instance "T=t2" that its parent ("N3" in FIG. 1A at time instance "T=t1") cannot satisfy the child-selected objective function "OF3", hence, the grandparent network device "N2" can change its attachment from "N3" to "N1" for the RPL instance associated with the child-selected objective function "OF3" at the time instance "T=t2"; for example, the network device "N2" can send an updated request 18' as a unicast request to the network device "N1" (or multicast request to neighboring network devices 12) to locate a network device capable of satisfying the updated request 18'. As described previously, the grandparent network device "N2" can store in its data structure 60 the multiple RPL instances for each request message 18.

Hence, the network devices "N11", "N2", and "N1" can proactively coordinate to guarantee that the child network device "N12" has an optimized tree-based topology for implementation in operation 64 of the objective function "OF3" (chosen by the child network device "N12") at the time instance "T=t2" in FIG. 1B. Hence, the network device "N11" in operation 64 can provide network communications to the child network device "N12", at the future time instance "T=t2" of FIG. 1B according to the optimization "OF3", via the path "N11-N2-N1-Root".

FIG. 1B also illustrates the network device "N4" changing its attachment from the network device "N1" to the root network device 14, for example based on determining its existing attachments (to network devices "N1" and "N3" in FIG. 1A) are incapable of satisfying the child-selected objective function "OF2" for the child network device "N6" at the future time instance "T=t2", or the child-selected objective function "OF3" at the time instance "T=t3" (for example, due to the network device "N1" powering down at the time instance "T=t3" into a sleep state). Hence, the network device "N4" executes operation 62 by attaching to the root network device 14 by the time instance "T=t2" of FIG. 1B, to provide in operation 64 network communications to the child network device "N6" at the time instance "T=t2" according to the child-selected objective function "OF2". A network device 12 also can add in operation 62 a second concurrent attachment if needed to satisfy a child-selected objective function at a future instance.

FIG. 1C illustrates additional optimizations that can be executed based on child-selected objective functions to be implemented at the future time instance "T=t3". For example, referring to FIG. 1B, assume that the network devices "N1" and "N11" will be entering a power-saving "sleep" mode ("S") after the time instance "T=t2" and will remain in the "sleep" mode until a future time instance "t4" after the time instance time instance "T=t3" (i.e., t2<t3<S<t4). The network device "N12", in response to determining that the network device "N11" will be unavailable to provide the optimization "OF4" at the time instance "T=t3", can change its attachment to the network device "N3" (e.g., in response to the network device "N3" acknowledging it can provide the optimization "OF4" at the future time instance "T=t3"). Similarly, the network device "N3", in response to later determining that the network device "N1" will be unavailable to provide the optimization "OF4" at the time instance "T=t3" (e.g., in response to receiving from the network device "N1" a denial to an updated request message 18' or an updated status message regarding the status of network device "N1", etc.), can change its attachment to the network device "N2" (e.g., in response to the network device "N2" acknowledging it can provide the optimization "OF4" at the future time instance "T=t3"). Hence, the network device "N12" in operation 64 can provide network communications to the child network device "N13", at the future time instance "T=t3" according to the optimization "OF4", via the path "N12-N3-N2-Root".

In another example, assume that the network device "N7" determines that the network device "N3" will be unavailable to provide an optimization of the objective function "OF4" at the future time instance "T=t3" for the child network device "N9"; further, the child network devices "N5" and "N9" cannot attach to another parent network device because they have entered a power-saving "sleep" mode ("S") from the time after sending the requests 18 in FIG. 1A to just before the time instance of FIG. 1C (i.e., t1<S<t3). Hence, the network device "N7" can execute the optimization in operation 58 on behalf of its child network device "N9" by sending an updated request 18' (unicast to the network device "N4" or multicast), and attaching to the network device "N4" in operation 62 in response to an acknowledgement from the network device "N4" specifying that it can provide the optimization of the objective function "OF4" at the future time instance "T=t3". Hence, the network device "N7" in operation 64 can provide network communications to the child network device "N9", at the future time instance "T=t3" according to the optimization "OF4", via the path "N7-N4-Root". Similarly, the network device "N4" in operation 64 can provide network communications to the child network device "N5", at the future time instance "T=t3" according to the optimization "OF3", via the path "N4-Root".

According to example embodiments, a time-based optimization can be implemented in a tree-based network, where a child network device can request generation of an optimized tree-based topology, according to a child-selected optimization function, for deployment at a future time instance for the future use by the child network device. Hence, a child network device can utilize an optimized tree-based topology that is optimized for the child network device at the time instance required by the child network device. The example embodiments enable the child-initiated requests to be propagated upward toward a root of the tree-based network topology, enabling the network devices to proactively provide the optimized network communications for the child network device. Further, each time-based optimization initiated by a child network device can be identified as a distinct RPL instance that is distinct from the RPL instance established by the root network device during network formation.

Hence, the example embodiments enable energy conservation by enabling network devices to enter a power-saving sleep state without disruption of network traffic; the proactive execution of child-selected objective functions also enable optimized tree-based topologies to be established dynamically prior to the time that a child network device requires an optimized tree-based topology; the example embodiments also enable dynamic changes in response to network disruption (e.g., failing network devices, etc.), without forcing the root network device to restart the root-based DODAG topology.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
receiving, by a network device within a tree-based topology rooted and established by a root network device according to a first objective function chosen by the root network device, a request message from a child network device that is in the tree-based topology, the request message requesting generation of an optimized tree-based topology for a future use by the child network device at a future time instance, the request message specifying a future use indicator identifying the future time instance chosen by the child network device and further specifying a second objective function chosen by the child network device, the second objective function chosen by the child network device independent and distinct from the first objective function chosen by the root network device;
the network device executing the second objective function for generating the optimized tree-based topology for the future use by the child network device at the future time instance chosen by the child network device, wherein the optimized tree-based topology generated based on the second objective function is distinct from the tree-based topology generated according to the first objective function; and
the network device providing network communications, for the child network device, at the future time instance using the optimized tree-based topology.

2. The method of claim 1, wherein the request message further identifies at least one of a future time duration relative to the future time instance, or a repeating instance attribute identifying repeating instances following the future time instance.

3. The method of claim 1, wherein the executing comprises:
detecting that an existing attachment to the tree-based topology does not provide an optimization for the future use by the child network device according to the second objective function; and
determining a second attachment in the tree-based topology that can provide the optimized tree-based topology at the future time instance for the future use by the child network device.

4. The method of claim 3, wherein the providing includes the network device attaching to the second attachment, by the future time instance, for the network communications using the optimized tree-based topology.

5. The method of claim 1, wherein:
the network device is attached to the tree-based topology by a parent network device;
the executing including the network device forwarding the request to the parent network device to determine whether the parent network device can execute the second objective function for generating at least a portion of the optimized tree-based topology for the child network device at the future time instance.

6. The method of claim 5, wherein the executing further includes:
detecting that the parent network device cannot generate at least a portion of the optimized tree-based topology for the child network device at the future time instance;
establishing a second attachment to a second parent device in the tree-based topology that can provide the optimized tree-based topology at the future time instance for the future use by the child network device, in response to the detecting.

7. An apparatus comprising
a device interface circuit configured for receiving a request message from a child network device in a tree-based topology, the apparatus implemented as a network device within the tree-based topology that is rooted and established by a root network device according to a first objective function chosen by the root network device, the request message requesting generation of an optimized tree-based topology for a future use by the child network device at a future time instance, the request message specifying a future use indicator identifying the future time instance chosen by the child network device and further specifying a second objective function chosen by the child network device, the second objective function chosen by the child network device independent and distinct from the first objective function chosen by the root network device; and
a processor circuit configured for executing the second objective function for generating the optimized tree-based topology for the future use by the child network device at the future time instance chosen by the child network device, wherein the optimized tree-based topology generated based on the second objective function is distinct from the tree-based topology generated according to the first objective function, the processor circuit configured for providing network communications, for the child network device, at the future time instance using the optimized tree-based topology.

8. The apparatus of claim 7, wherein the processor circuit is configured for executing the second objective function based on detecting that the request message further identifies at least one of a future time duration relative to the future time instance, or a repeating instance attribute identifying repeating instances following the future time instance.

9. The apparatus of claim 7, wherein the processor circuit is configured for executing the second objective function based on:
detecting that an existing attachment to the tree-based topology does not provide an optimization for the future use by the child network device according to the second objective function; and
determining a second attachment in the tree-based topology that can provide the optimized tree-based topology at the future time instance for the future use by the child network device.

10. The apparatus of claim 9, wherein the processor circuit is configured for causing the network device to attach to the second attachment, by the future time instance, for the network communications using the optimized tree-based topology.

11. The apparatus of claim 7, wherein:
the network device is attached to the tree-based topology by a parent network device;
the processor circuit is configured for executing the second objective function based on forwarding the request to the parent network device to determine whether the parent network device can execute the second objective function for generating at least a portion of the optimized tree-based topology for the child network device at the future time instance.

12. The apparatus of claim 11, wherein the processor circuit is configured for executing the second objective function based on:

detecting that the parent network device cannot generate at least a portion of the optimized tree-based topology for the child network device at the future time instance;

establishing a second attachment to a second parent device in the tree-based topology that can provide the optimized tree-based topology at the future time instance for the future use by the child network device, in response to the detecting.

13. One or more non-transitory tangible media encoded with logic for execution by a machine and when executed by the machine operable for:

receiving, by the machine implemented as a network device within a tree-based topology rooted and established by a root network device according to a first objective function chosen by the root network device, a request message from a child network device that is in the tree-based topology, the request message requesting generation of an optimized tree-based topology for a future use by the child network device at a future time instance, the request message specifying a future use indicator identifying the future time instance chosen by the child network device and further specifying a second objective function chosen by the child network device, the second objective function chosen by the child network device independent and distinct from the first objective function chosen by the root network device;

executing the second objective function for generating the optimized tree-based topology for the future use by the child network device at the future time instance chosen by the child network device, wherein the optimized tree-based topology generated based on the second objective function is distinct from the tree-based topology generated according to the first objective function; and providing network communications, for the child network device, at the future time instance using the optimized tree-based topology.

14. The one or more non-transitory tangible media of claim 13, wherein the request message further identifies at least one of a future time duration relative to the future time instance, or a repeating instance attribute identifying repeating instances following the future time instance.

15. The one or more non-transitory tangible media of claim 13, wherein the executing comprises:

detecting that an existing attachment to the tree-based topology does not provide an optimization for the future use by the child network device according to the second objective function;

determining a second attachment in the tree-based topology that can provide the optimized tree-based topology at the future time instance for the future use by the child network device.

16. The one or more non-transitory tangible media of claim 13, wherein:

the network device is attached to the tree-based topology by a parent network device;

the executing including the network device forwarding the request to the parent network device to determine whether the parent network device can execute the second objective function for generating at least a portion of the optimized tree-based topology for the child network device at the future time instance.

17. The one or more non-transitory tangible media of claim 16, wherein the executing further includes:

detecting that the parent network device cannot generate at least a portion of the optimized tree-based topology for the child network device at the future time instance;

establishing a second attachment to a second parent device in the tree-based topology that can provide the optimized tree-based topology at the future time instance for the future use by the child network device, in response to the detecting.

\* \* \* \* \*